US008152371B2

(12) United States Patent
Tajima

(10) Patent No.: US 8,152,371 B2
(45) Date of Patent: Apr. 10, 2012

(54) TEMPERATURE SENSOR CIRCUIT WITH REFERENCE VOLTAGE THAT EXHIBITS THE SAME NONLINEAR TEMPERATURE RESPONSE AS THE TEMPERATURE SENSOR

(75) Inventor: Hideyuki Tajima, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 448 days.

(21) Appl. No.: 12/385,526

(22) Filed: Apr. 10, 2009

(65) Prior Publication Data

US 2009/0256623 A1 Oct. 15, 2009

(30) Foreign Application Priority Data

Apr. 11, 2008 (JP) ................................ 2008-104006

(51) Int. Cl.

*G01K 7/00* (2006.01)
*G01K 7/16* (2006.01)
*G01K 7/22* (2006.01)
*G01K 7/24* (2006.01)
*G01K 7/25* (2006.01)

(52) U.S. Cl. .................. 374/170; 374/172; 374/E7.033; 324/512

(58) Field of Classification Search .......... 374/170-173, 374/E7.033; 324/512, 513; 702/130, 133
See application file for complete search history.

(56) References Cited

U.S. PATENT DOCUMENTS

| | | | | |
|---|---|---|---|---|
| 4,267,468 | A * | 5/1981 | Hilliker | 327/512 |
| 4,448,549 | A * | 5/1984 | Hashimoto et al. | 374/170 |
| 6,183,131 | B1 * | 2/2001 | Holloway et al. | 374/172 |
| 7,033,072 | B2 * | 4/2006 | Aota et al. | 374/178 |
| 7,427,158 | B2 * | 9/2008 | Yoshida | 374/172 |
| 2004/0233600 | A1 * | 11/2004 | Yoshida et al. | 361/90 |
| 2010/0141329 | A1 * | 6/2010 | Kim | 327/513 |

FOREIGN PATENT DOCUMENTS

| | | |
|---|---|---|
| JP | 56-135963 | 10/1981 |
| JP | 2009-257790 A * | 11/2009 |

* cited by examiner

*Primary Examiner* — Randy W Gibson
(74) *Attorney, Agent, or Firm* — Foley & Lardner LLP

(57) ABSTRACT

In a temperature sensor circuit, a temperature sensor is configured to output a first voltage corresponding to temperature. A voltage source is configured to output a second voltage having the same nonlinear dependence on the temperature as a nonlinear dependence of the first voltage on the temperature. An amplifier is configured to amplify the second voltage with a first amplification factor to output a third voltage. An inversion amplifier is configured to perform inversion amplification on a difference between the first voltage and the third voltage with a second amplification factor to output a fourth voltage.

8 Claims, 3 Drawing Sheets

TEMPERATURE SENSOR CIRCUIT WITH REFERENCE VOLTAGE THAT EXHIBITS THE SAME NONLINEAR TEMPERATURE RESPONSE AS THE TEMPERATURE SENSOR

INCORPORATION BY REFERENCE

This patent application claims priority on convention based on Japanese Patent Application No. 2008-104006. The disclosure thereof is incorporated herein by reference.

BACKGROUND OF THE INVENTION

1. Field of the Invention

The present invention relates to a temperature sensor circuit, and more particularly, to a temperature sensor circuit in which influence of nonlinear characteristics is eliminated.

2. Description of Related Art

There is known a temperature sensor circuit that includes a temperature sensor to measure a temperature. For example, Japanese Patent Application Publication (JP-A-Showa 56-135963: related art 1) discloses a semiconductor integrated circuit for a temperature sensor. FIG. 1 is a circuit diagram illustrating a configuration of the semiconductor integrated circuit for the temperature sensor in the related art 1. The semiconductor integrated circuit for the temperature sensor includes a temperature sensor (junction transistor for the temperature sensor) 103 using a first conductive type of substrate as a collector, a second conductive type of a diffusion layer as a base, and the first conductive type of a diffusion layer formed in the second conductive type of the diffusion layer as an emitter; and a constant current source (complementary insulated gate field effect transistor type constant current circuit) 102 present within the same substrate, and is characterized by defining a base-emitter voltage of the temperature sensor 103 as a temperature detecting voltage.

In the semiconductor integrated circuit of the related art 1 illustrated in FIG. 1, an output voltage V0 is expressed by the following equation (100) on the basis of forward voltage drop characteristics of a diode:

$$
\begin{aligned}
V0 &= \frac{kT}{q}\ln\left(\frac{Id}{I_S}\right) \\
&= \frac{k}{q}T\{\ln(Id) - \ln(b) - m\cdot\ln(T)\} + \frac{Eg}{q} \\
&\left[\because I_S = bT^m\exp\left(\frac{-Eg}{kT}\right)\right]
\end{aligned}
\tag{100}
$$

where q is an elementary charge, k is a Boltzmann constant, T is absolute temperature, Is is a saturation current, b is a proportional constant, m is a saturation current temperature coefficient, and Eg is a bandgap energy.

As expressed by the equation, there exists a nonlinear term "−m×ln (T)" of a voltage with respect to the temperature T. FIG. 2 is a graph illustrating a relationship between the temperature and the output voltage in the above-described semiconductor integrated circuit for the temperature sensor. A vertical axis represents the output voltage V0, and a horizontal axis represents the temperature T. Also, a solid line B represents a curve expressed by the above equation (100), and a dashed line A represents a straight line (linear line) partially coming into contact with the solid line B. In the above equation (100), m is not essentially equal to zero ($m \neq 0$). For this reason, as illustrated in FIG. 2, the solid line B loses touch with the dashed line A while partially coming into contact with the dashed line A. That is, the output voltage V0 has a nonlinear voltage error with respect to the temperature T. In high accuracy measurements in which a voltage error becomes significant, the voltage error has been corrected mainly by a multipoint calibration. Therefore the related art 1 leads to increase in cost. Accordingly, there is desired a technique capable of detecting a temperature with lower cost and higher accuracy.

SUMMARY

In an aspect of the present invention, a temperature sensor circuit includes a temperature sensor configured to output a first voltage corresponding to temperature; a voltage source configured to output a second voltage having the same nonlinear dependence on the temperature as a nonlinear dependence of the first voltage on the temperature; an amplifier configured to amplify the second voltage with a first amplification factor to output a third voltage; and an inversion amplifier configured to perform inversion amplification on a difference between the first voltage and the third voltage with a second amplification factor to output a fourth voltage.

The present invention can provide a temperature sensor circuit that enables a temperature to be detected with higher accuracy.

BRIEF DESCRIPTION OF THE DRAWINGS

The above and other objects, advantages and features of the present invention will be more apparent from the following description of certain embodiments taken in conjunction with the accompanying drawings, in which.

DESCRIPTION OF THE PREFERRED EMBODIMENTS

Figure 1:
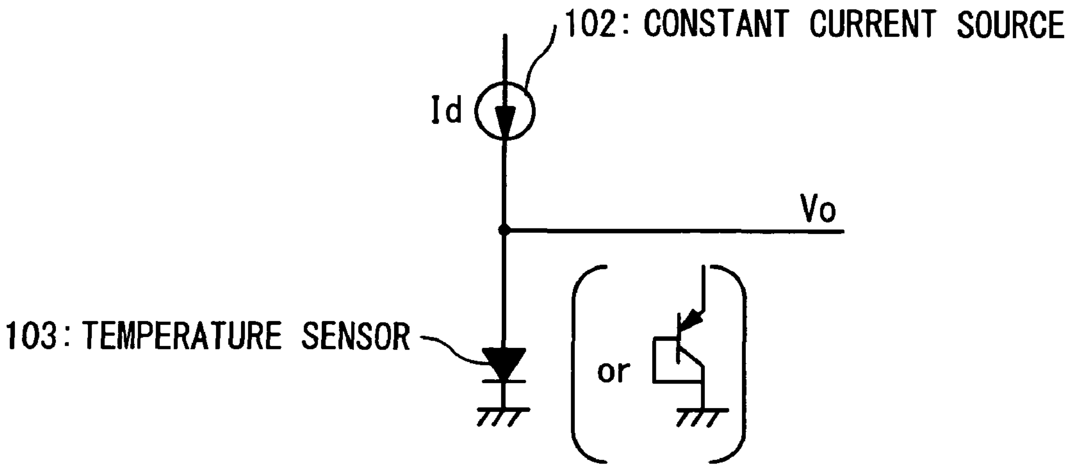
Fig. 1 RELATED ART
FIG. 1 is a circuit diagram illustrating a configuration of a conventional semiconductor integrated circuit for a temperature sensor.
Figure 2:
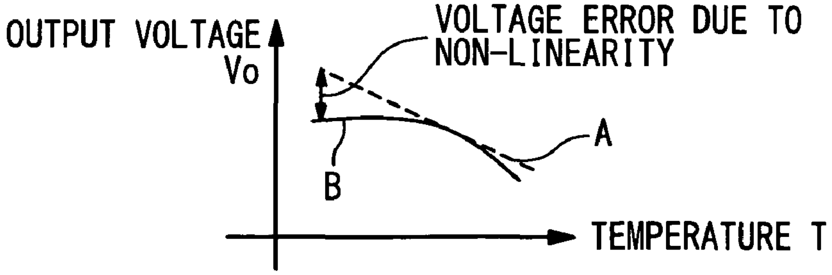
Fig. 2 RELATED ART
FIG. 2 is a diagram illustrating a relationship between a temperature and an output voltage in the conventional semiconductor integrated circuit shown in FIG. 1.
Figure 3:
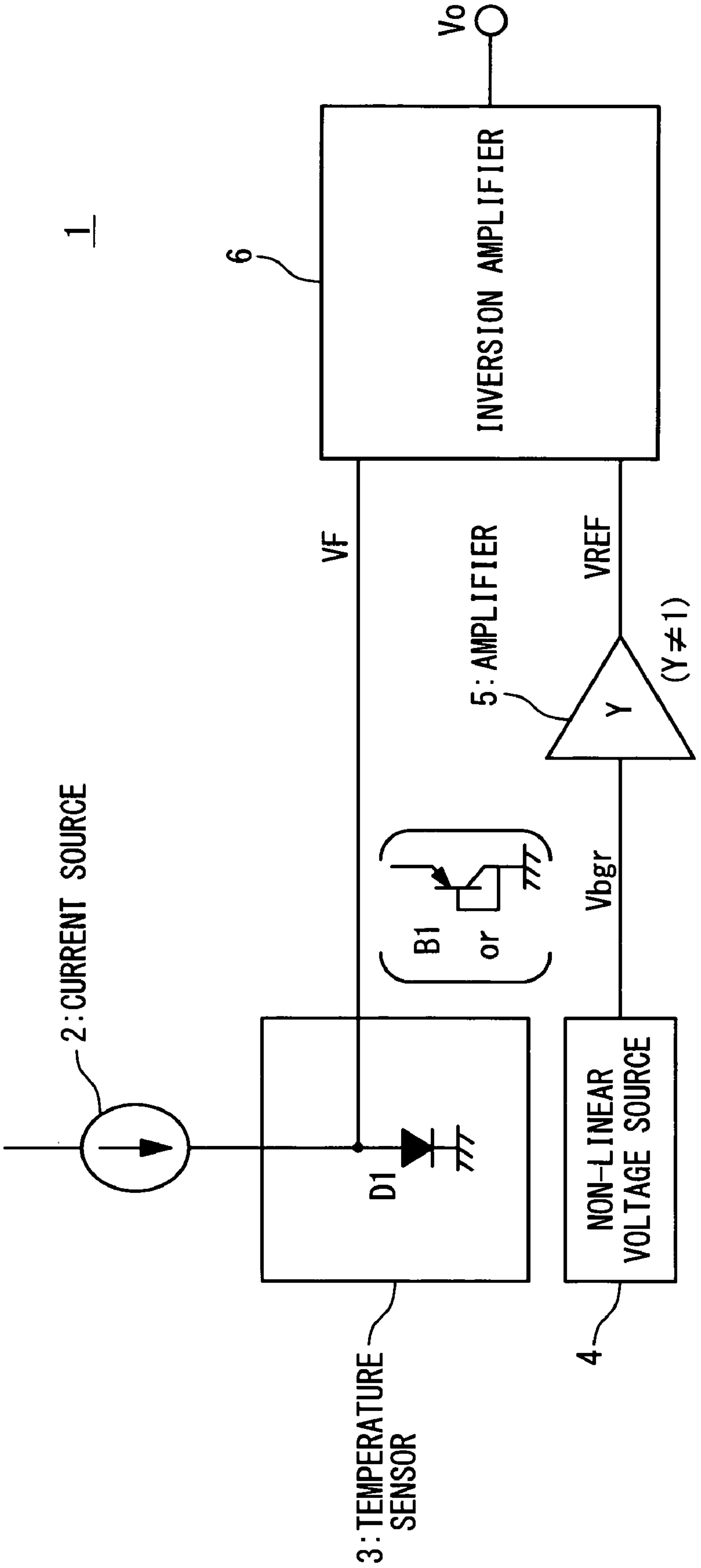
FIG. 3 is a block diagram illustrating a configuration of a temperature sensor circuit according to an embodiment of the present invention.

Hereinafter, a temperature sensor circuit according to the present invention will be described with reference to the attached drawings. FIG. 3 is a block diagram illustrating a configuration of a temperature sensor circuit according to an embodiment of the present invention. The temperature sensor circuit 1 includes a current source 2, a temperature sensor 3, a nonlinear voltage source 4, an amplifier 5, and an inversion amplifier 6 which are formed on a same semiconductor substrate (within a same chip).

The current source 2 supplies a current to the temperature sensor 3 and the nonlinear voltage source 4. That is, the temperature sensor 3 and the nonlinear voltage source 4 use the current having the same dependency on temperature T. Preferably, the current source 2 supplies a current $I_{PTAT}$ (Proportional To Absolute Temperature) that varies in proportion to the temperature T.

The temperature sensor 3 outputs an output voltage VF corresponding to the temperature T. The temperature sensor 3 is exemplified by one or more diodes D1, or a bipolar transistor B1 in which a base and a collector are short-circuited.

The nonlinear voltage source 4 outputs a reference voltage Vbgr. Nonlinear dependency of the reference voltage Vbgr on the temperature T is the same as nonlinear dependency of the output voltage VF on the temperature T in the temperature sensor 3. The nonlinear voltage source 4 is exemplified by a bandgap reference circuit.

The amplifier 5 amplifies the reference voltage Vbgr with a first gain Y to output as a reference voltage VREF. It should be noted that the first gain Y is not equal to one (Y≠1).

The inversion amplifier 6 inversion-amplifies a difference between the output voltage VF and the reference voltage VREF with a second gain G to output as a fourth voltage V0.

Next, referring to FIG. 3, an operation of the temperature sensor circuit according to the embodiment of the present invention will be described. The temperature sensor 3 converts the temperature T into the output voltage VF. The diode D1 as the temperature sensor 3 is supplied as a bias current with the current $I_{PTAT}$ ($I_{PTAT}$=A×T) varying in proportion to the temperature T. At this time, the output voltage VF of the diode D1 is expressed by the following equation (1) on the basis of forward voltage drop characteristic of the diode D1:

$$\begin{aligned} VF &= \frac{kT}{q}\ln\left(\frac{I_{PTAT}}{I_S}\right) \\ &= \frac{k}{q}T\{\ln(A) - \ln(b) + (1-m)\cdot\ln(T)\} + \frac{Eg}{q} \\ &\left[\because I_S = bT^m\exp\left(\frac{-Eg}{kT}\right)\right] \end{aligned} \tag{1}$$

where q is an elementary charge, k is the Boltzmann constant, T is absolute temperature, Is is a saturation current, A is a proportional constant, b is a proportional constant, m is a saturation current temperature coefficient, and Eg is a bandgap energy.

Regarding the nonlinear voltage source 4, the nonlinear dependency of the reference voltage Vbgr on the temperature T is the same as the nonlinear dependency of the temperature sensor 3, and have a nonlinear term [(k/q)×T×(1−m)×ln(T)] with respect to the temperature T. The reference voltage Vbgr of the nonlinear voltage source 4 is expressed by the following equation (2):

$$Vbgr = \frac{kT}{q}(1-m)\cdot\ln(T) + Vz \tag{2}$$

where Vz represents a voltage that is constant with or proportional to the temperature.

The amplifier 5 outputs the reference voltage VREF obtained by multiplying the reference voltage Vbgr of the nonlinear voltage source 4 by Y. The reference voltage VREF is expressed by the following equation (3):

$$\begin{aligned} VREF &= Y\cdot Vbgr \\ &= Y\cdot\left\{\frac{kT}{q}(1-m)\cdot\ln(T) + Vz\right\} \end{aligned} \tag{3}$$

The inversion amplifier 6 uses the output voltage VF as an input voltage and the reference voltage VREF as a reference voltage to inversion-amplify (G times) a difference between the input voltage VF and the reference voltage VREF, and outputs the output voltage V0 that is shifted for the reference voltage VREF. From the above equations (1) and (3), the output voltage Vo is expressed by the following equation (4):

$$\begin{aligned} V0 &= -G\cdot(VF - VREF) + VREF \\ &= -\frac{k}{q}G\cdot T\cdot\left[\begin{matrix}\ln(A) - \ln(b) + (1-m) \\ \left\{1 - Y\cdot\left(1+\frac{1}{G}\right)\right\}\cdot\ln(T)\end{matrix}\right] + \\ &\quad (1+G)\cdot Y\cdot Vz - \frac{Eg}{q}G \end{aligned} \tag{4}$$

In the above equation (4), a nonlinear term of the output voltage Vo is expressed as "−(k/q)×G×T×[(1−m)×{1−Y×(1+1/G)}×ln(T)]". Accordingly, by adjusting the gains Y and G determined on the basis of circuit constants of the amplifier 5 and the inversion amplifier 6, a value of "{1−Y×(1+1/G)}" in the above nonlinear term can be made zero. Based on this, a value of the above entire nonlinear term can also be made zero. As a result, a voltage proportional to the temperature T can be obtained as the output voltage Vo.

As described, the gains Y and G determined on the basis of the circuit constants of the amplifier 5 and the inversion amplifier 6 can be set so as to eliminate a nonlinear component in the dependency of the output voltage Vo on the temperature T. The circuit constants determining the gains Y and G of the amplifier 5 and the inversion amplifier 6 may be determined upon design of the temperature sensor circuit. Alternatively, well-known adjustment circuits may be provided inside the amplifier 5 and the inversion amplifier 6 to adjust the corresponding circuit constants after manufacturing or upon use of the temperature sensor circuit.

In the present invention, the nonlinear voltage source 4 and the temperature sensor 3 having the same nonlinear characteristic on the dependencies of an output voltage on the temperature T are used. For this reason, by inversion-amplifying the difference between the reference voltage VREF obtained by amplifying the reference voltage Vbgr of the nonlinear voltage source 4 and the output voltage VF of the temperature sensor 3, the nonlinear component of the output voltage Vo can be eliminated. Based on this, as the temperature sensor circuit, the voltage proportional to the temperature can be obtained, regardless of a manufacturing process. As a result, a temperature detecting accuracy of the temperature sensor circuit can be improved.

As described, only by adjusting the circuit constants (Y and G) of the amplifier 5 and the inversion amplifier 6, the nonlinearity of the voltage with respect to the temperature T can be made zero, and the temperature sensor circuit capable of obtaining the output voltage Vo proportional to the temperature T can be provided, regardless of the manufacturing process for the temperature sensor circuit.

Figure 4:
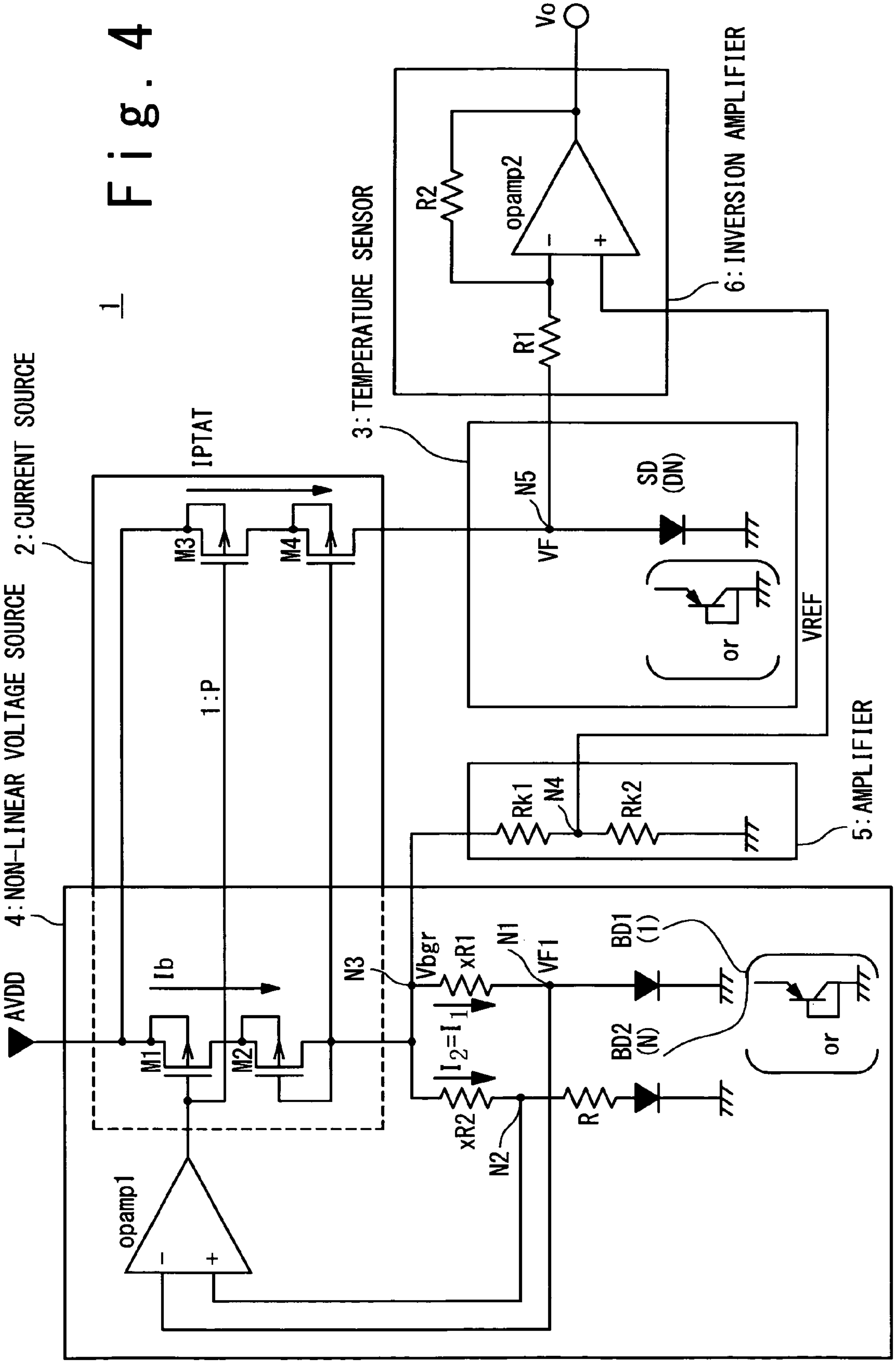
FIG. 4 is a block diagram illustrating a configuration in a specific example of the temperature sensor circuit according to the embodiment of the present invention.

Next, the temperature sensor circuit according to the present embodiment will be described in more detail. FIG. 4 is a block diagram illustrating a configuration in a specific example of the temperature sensor circuit according to the embodiment of the present invention.

Regarding the nonlinear voltage source 4, the reference voltage Vbgr thereof has a nonlinear term with respect to the temperature. The nonlinear voltage source 4 is a bandgap reference circuit of an operational amplifier type including an operational amplifier (Opamp1), transistors M1 and M2, resistors xR1, xR2, and R, and diodes BD1 and BD2. The single diode BD1 is grounded at a cathode, and connected to a node N1 at an anode. The diode BD1 may be replaced by a bipolar transistor in which a base and a collector are short-circuited. The resistor xR1 is connected to the node N1 at one end, and to a node N3 at the other end. The N diodes BD2 (N is a natural number, and connected to in parallel) are grounded at a cathode, and connected to one end of the resistor R at an anode. The diode BD2 may be replaced by a bipolar transistor in which a base and a collector are short-circuited. The resistor R is connected to the anode side of the diode BD2 at the one end thereof, and to a node N2 at the other end thereof. The resistor xR2 is connected to the node N2 at one end thereof, and to the node N3 at the other end thereof. The operational amplifier (Opamp1) is connected to the node N1 at a minus side input terminal thereof, and to the node N2 at a plus side input terminal thereof. The transistor M1 is a PMOS transistor in which a source and a body are connected to a power supply AVDD, and a gate to an output terminal of the operational amplifier (Opamp1) and a drain to a source of the transistor M2. The transistor M2 is a PMOS transistor in which a source and a body are connected to the drain of the transistor M1, and a gate and a drain to the node N3, respectively.

The serially connected transistors M1 and M2 constitute a load of the bandgap reference circuit. They simultaneously constitute an input side of a current mirror circuit of the current source 2, as will be described later. A current Ib flowing to the input side flows from the power supply AVDD to the node N3 through the transistors M1 and M2. At the node N3, the current Ib is divided into currents I1 and I2. The current I1 flows to the ground through the resistor xR1 and a diode BD1. The current 12 flows to the ground through the resistors xR2 and R, and a diode BD2. The bandgap reference circuit of an operational amplifier type outputs a voltage generated at the node N3 to the amplifier 5 as the reference voltage Vbgr.

The current source 2 is formed of a current mirror circuit that mirrors, with use of the transistors M1, M2, M3, and M4, the current Ib flowing through a load of the above-described bandgap reference circuit. The transistors M1 and M2 are as has been described. That is, the transistors M1 and M2 are shared by the nonlinear voltage source 4 and the current source 2. For this reason, an area of a circuit section including the nonlinear voltage source 4 and the current source 2 can be made small. The transistor M3 is a PMOS transistor in which a source and a body are connected to the power supply AVDD, a gate to an output terminal of the operational amplifier (Opamp1), and a drain to a source of the transistor M4. The transistor M4 is a PMOS transistor in which the source and a body are connected to the drain of the transistor M3, a gate to the node N3, and a drain to a node N5 (temperature sensor 3).

A same current as the current Ib flowing through a current path (transistors M1 and M2) on an input side of the current mirror circuit flows through a current path (transistors M3 and M4) on an output side as the current $I_{PTAT}$. Accordingly, the current $I_{PTAT}$ is supplied to the temperature sensor 3 connected to an output side current path.

The amplifier 5 is connected with an output side of the bandgap reference circuit on an input side thereof, and with a non-inversion input terminal of the inversion amplifier 6 on an output side thereof. The amplifier 5 is a resistance voltage dividing circuit having resistors Rk1 and Rk2. The resistor Rk1 is connected to the node N3 at one end thereof, and to a node N4 at the other end thereof. The resistor Rk2 is connected to the node N4 at one end thereof, and to the ground at the other end thereof. The gain Y is [Rk2/(Rk1+Rk2)]. The amplifier 5 amplifies with the gain Y the reference voltage Vbgr supplied from the bandgap reference circuit to output the reference voltage VREF.

The temperature sensor 3 is supplied with the current $I_{PTAT}$ from the current source 2, and includes DN diode SD (DN is a natural number, connected in parallel) that generates the output voltage VF corresponding to the temperature T. The diode SD is grounded on a cathode side thereof, and connected to the node N5 on an anode side thereof. The diode SD may be replaced by a bipolar transistor in which a base and a collector are short-circuited. The node N5 is connected to an inversion input terminal of the inversion amplifier 6, and an output voltage V5 generated at the node N5 is supplied to the inversion input terminal.

The inversion amplifier 6 includes resistors R1 and R2, and an operational amplifier (Opamp2). The resistor R1 is connected to the inversion input terminal at one end thereof, and to one end of the resistor R2 and an inversion input terminal of the operational amplifier (Opamp2) at the other end thereof. The resistor R2 is connected to the one end of the resistor R1 and the inversion input terminal of the operational amplifier (Opamp2) at the one terminal thereof, and to an output terminal of the operational amplifier (Opamp2) at the other end thereof. The non-inversion input terminal of the operational amplifier (Opamp2) is connected with the output side of the amplifier 5 (node N4). The gain G is R2/R1. The inversion amplifier 6 is supplied with the output voltage VF at the inversion input terminal thereof and with the reference voltage VREF at the non-inversion input terminal thereof, and performs inversion-amplification with the gain G to output the output voltage V0.

Next, referring to FIG. 4, the operation of the temperature sensor circuit according to the embodiment of the present invention will be described. The current Ib flowing through the load of the bandgap reference circuit of the nonlinear voltage source 4 is obtained as follows. That is, if the operational amplifier (Opamp1) is an ideal operational amplifier, voltages at the non-inversion and inversion input terminals of the operational amplifier are the same in a feedback state. For this reason, voltages at the nodes N1 and N2 become equal to each other. Based on this, a voltage drop ΔV (=VF1−VBD2) by the resistor R is obtained as follows, so that the current I2 (=ΔV/R) flowing through the resistor R is obtained, and therefore the current Ib is expressed by the following expression (5):

$$\begin{aligned}\Delta V &= VF1 - VBD2 \\ &= \frac{kT}{q}\cdot\ln\left(\frac{I2}{Is}\right) - \frac{kT}{q}\cdot\ln\left(\frac{I2}{NIs}\right) \\ &= \frac{k}{q}\cdot\ln(N)\cdot T\end{aligned} \tag{5}$$

$$I_2 = \frac{\Delta V}{R} = \frac{\frac{k}{q}\cdot\ln(N)}{R}\cdot T$$

$$\begin{aligned}Ib &= 2I_2 + I_k \\ &= \frac{2\frac{k}{q}\cdot\ln(N)}{R}T + \frac{Vbgr}{Rk1 + Rk2} \\ &\approx 2\frac{k}{q}\cdot\frac{\ln(N)}{R}T \\ &\left[\because 2\cdot\frac{k}{q}\frac{\ln(N)}{R}T >> \frac{\text{Vbgr}}{Rk1 + Rk2}\right]\end{aligned}$$

where VF1 is a voltage at the node N1, VBD2 is a voltage on the anode side of the diode BD2, N is the number of diodes BD2 in the bandgap reference circuit, R is a resistance value of the resistor R in the bandgap reference circuit, Ik is a current flowing through the amplifier 5, Vbgr is an output voltage of the bandgap reference circuit, and Rk1 and Rk2 are resistance values of the resistance voltage dividing circuit of the amplifier 5.

Supposing that a mirror ratio of the current mirror circuit of the current source 2 is denoted by P, the bias current $I_{PTAT}$ flowed through the diode SD of the temperature sensor 3 is expressed by the following equation (6):

$$I_{PTAT}=P\cdot Ib \tag{6}$$

Accordingly, from the expression (6) and a forward voltage drop characteristic of a diode, the voltage VF of the diode SD is expressed by the following equation (7):

$$\begin{aligned} VF &= \frac{kT}{q}\ln\left(\frac{I_{PTAT}}{DN\cdot I_S}\right) \\ &= \frac{k}{q}T\{\ln(2)+\ln(P)-\ln(DN)+\ln(k)-\ln(q)+\ln(\ln(N))- \\ &\quad \ln(R)-\ln(b)+(1-m)\cdot\ln(T)\}+\frac{Eg}{q} \end{aligned} \tag{7}$$

where DN is the number of diodes SD of the temperature sensor 3.

On the other hand, the reference voltage Vbgr (voltage at the node N3) of the bandgap reference circuit of the nonlinear voltage source 4 is expressed by the following equation (8):

$$\begin{aligned} Vbgr &= VF1+xR\cdot I1 \\ &= VF1+xR\cdot\frac{k}{q}\cdot\frac{\ln(N)}{R}T \\ &\quad \frac{k}{q}T\{\ln(k)-\ln(q)+\ln(\ln(N))-\ln(R)-\ln(b)+ \\ &\quad (1-m)\cdot\ln(T)+x\cdot\ln(N)\}+\frac{Eg}{q} \\ &\left[\because I1=\frac{Ib}{2}=\frac{2\frac{k}{q}\cdot\frac{\ln(N)}{R}T}{2}=\frac{k}{q}\cdot\frac{\ln(N)}{R}T\right] \end{aligned} \tag{8}$$

where resistance values of the resistors xR1 and xR2 are assumed to be xR (=x×R).

The reference voltage VREF outputted from the amplifier 5 is obtained by dividing the reference voltage Vbgr with the resistors Rk1 and Rk2, and expressed by the following equation (9):

$$\begin{aligned} VREF &= \frac{Rk2}{Rk1+Rk2}\cdot Vbgr \\ &= \frac{Rk2}{Rk1+Rk2}\cdot\frac{k}{q}T\left\{\begin{matrix}\ln(k)-\ln(q)+\ln(\ln(N))-\ln(R)- \\ \ln(b)+(1-m)\cdot\ln(T)+x\cdot\ln(N)\end{matrix}\right\}+ \\ &\quad \frac{Rk2}{Rk1+Rk2}\cdot\frac{Eg}{q} \end{aligned} \tag{9}$$

The output voltage Vo of the inversion amplifier 6 is obtained by performing inversion amplification of a difference between the output voltage VF and the reference voltage VREF with the gain G=R2/R1 to shift it for the reference voltage VREF, and expressed by the following equation (10):

$$\begin{aligned} V0 &= -\frac{R2}{R1}\cdot(VF-VREF)+VREF \\ &= -\frac{k}{q}\cdot\frac{R2}{R1}\cdot T\cdot[\ln(2)+\ln(P)-\ln(DN)- \\ &\quad \left(1+\frac{R1}{R2}\right)\cdot\frac{Rk2}{Rk1+Rk2}\cdot x\cdot\ln(N)+ \\ &\quad \left\{1-\left(1+\frac{R1}{R2}\right)\cdot\frac{Rk2}{Rk1+Rk2}\right\}\cdot \\ &\quad \left\{\begin{matrix}\ln(k)-\ln(q)+\ln(\ln(N))- \\ \ln(R)-\ln(b)+(1-m)\cdot\ln(T)\end{matrix}\right\}]- \\ &\quad \frac{R2}{R1}\cdot\frac{Eg}{q}\cdot\left\{1-\left(1+\frac{R1}{R2}\right)\cdot\frac{Rk2}{Rk1+Rk2}\right\} \end{aligned} \tag{10}$$

In the above equation (10), a nonlinear term is the following term (11):

$$\left\{1-\left(1+\frac{R1}{R2}\right)\cdot\frac{Rk2}{Rk1+Rk2}\right\}\cdot(1-m)\cdot\ln(T) \tag{11}$$

$$\left\{1-\left(1+\frac{R1}{R2}\right)\cdot\frac{Rk2}{Rk1+Rk2}\right\} \tag{12}$$

It should be noted that the factor (12) in the term (11) can be made zero by adjusting the circuit constants R1 and R2 of the inversion amplifier 6 and those Rk1 and Rk2 of the amplifier 5. In this case, the term (11) also becomes zero as a whole. That is, the nonlinear term (11) in the above expression (10) can be made zero by adjusting the circuit constants R1, R2, Rk1, and Rk2.

In such a case, the equation (10) can be expressed by the following equation (13):

$$\begin{aligned} V0 &= -C1\cdot T \\ C1 &= \frac{k}{q}\cdot\frac{R2}{R1}\cdot\left[\begin{matrix}\ln(2)+\ln(P)-\ln(DN)- \\ \left(1+\frac{R1}{R2}\right)\cdot\frac{Rk2}{Rk1+Rk2}\cdot x\cdot\ln(N)\end{matrix}\right] \end{aligned} \tag{13}$$

Based on the above respective assumptions, a factor C1 in the equation (13) is a constant. That is, the output voltage V0 of the inversion amplifier 6 takes a voltage proportional to the temperature T. As described above, by appropriately adjusting the respective circuit constants R1, R2, Rk1, and Rk2, the output voltage V0 of the inversion amplifier 6 can be made equal to a voltage proportional to the temperature T.

Thus, only by adjusting the circuit constants (e.g., Rk1 and Rk2) corresponding to the gain of the amplifier 5, and those (e.g., R1 and R2) corresponding to the gain of the inversion amplifier 6, the nonlinearity of the voltage with respect to the temperature T can be made zero, regardless of a manufacturing process of the temperature sensor circuit. Accordingly, the temperature sensor circuit 1 capable of obtaining the output voltage V0 proportional to the temperature T can be provided.

As is well known, a voltage source is preferably resistant to external noise. That is, as the voltage source, one capable of feeding a constant voltage without depending on a power supply voltage or a temperature is required. As such a voltage source, a bandgap reference circuit is generally widely used. The bandgap reference circuit functions as a voltage source independent of temperature characteristics by using elements respectively having positive and negative temperature characteristics to cancel both of the temperature characteristics. In the present invention, the bandgap reference circuit is used as the nonlinear voltage source 4. In this case, the diodes BD1 and BD2 have negative temperature characteristics. Accordingly, in order to give positive temperature characteristics to the resistors xR1, xR2, and R, it is performed to give positive temperature characteristics to the currents I1 and I2 (=Ib/2) flowed through the resistors xR1, xR2, and R. That is, the current Ib is made substantially directly proportional to the temperature T. As a result, the bandgap reference circuit can supply the voltage independent of temperature characteristics, because the voltages at the diodes BD1 and BD2 have the negative temperature characteristics whereas those at the resistors xR1, xR2, and R have the positive temperature characteristics, and therefore the both types of voltages cancel each other.

In the present invention, the bandgap reference circuit is used as the nonlinear voltage source 4. For this reason, in the reference voltage of the nonlinear voltage source 4 or the amplifier 5, the term [1×ln(T)] of the term [(1−m)×ln(T)] in the above equation (8) or (9) appears. A term corresponding to the term [1×ln(T)] is generated by the output voltage of the temperature sensor 3, and therefore, as the current source 2, the current source for flowing the current $I_{PTAT}$ having positive temperature characteristics is used. Based on this, in the output voltage of the temperature sensor 3, [(1−m)×ln(T)] in the above equation (7) can be generated. The term [1×ln(T)] of this term is generated on the basis of the current $I_{PTAT}$ having the positive temperature characteristics. As a result, by taking the difference between the reference voltage VREF in the equation (9) and the output voltage VF in the equation (7), the nonlinear terms [(1−m)×ln(T)] can be cancelled. Accordingly, the temperature sensor circuit 1 capable of obtaining the output voltage Vo proportional to the temperature can be provided.

It should be noted that, even when the currents I1 and I2 (=Ib/2) do not have the positive temperature characteristics, if the resistors xR1, xR2, and R have the positive temperature characteristics, the currents I1 and I2 (=Ib/2) may be constant currents independent of the temperature. In this case, the current flowed through the temperature sensor 3 is also made to be a constant current independent of the temperature. Based on this, the term [(1−m)×ln(T)] in the above equation (8) or (9) simply becomes [m×ln(T)]. Similarly, the term [(1−m)×ln(T)] in the above equation (7) simply becomes [m×ln(T)]. As a result, by taking the difference between the reference voltage VREF in the equation (9) and the output voltage VF in the equation (7), the nonlinear terms [m×ln(T)] can be cancelled. Accordingly, even in this case, the temperature sensor 1 capable of obtaining the output voltage V0 proportional to the temperature can be provided.

Although the present invention has been described above in connection with several embodiments thereof, it would be apparent to those skilled in the art that those embodiments are provided solely for illustrating the present invention, and should not be relied upon to construe the appended claims in a limiting sense.

What is claimed is:

1. A temperature sensor circuit comprising:

a temperature sensor configured to output a first voltage corresponding to temperature;

a voltage source configured to output a second voltage having the same nonlinear dependence on the temperature as a nonlinear dependence of the first voltage on the temperature;

an amplifier configured to amplify the second voltage with a first amplification factor to output a third voltage; and an inversion amplifier configured to perform inversion amplification on a difference between the first voltage and the third voltage with a second amplification factor to output a fourth voltage.

2. The temperature sensor circuit according to claim 1, wherein the first amplification factor and the second amplification factor are set so as to cancel non-linear components in dependence of the fourth voltage to the temperature.

3. The temperature sensor circuit according to claim 1, wherein said temperature sensor and said voltage source use electric currents with a same dependence on the temperature.

4. The temperature sensor circuit according to claim 1, further comprising:

a current source configured to supply the current to said temperature sensor and said voltage source.

5. The temperature sensor circuit according to claim 4, wherein said voltage source is a bandgap reference circuit, and said current source outputs the currents which are proportional to the temperature.

6. The temperature sensor circuit according to claim 5, wherein a part of said voltage source and a part of said current source are common to each other.

7. The temperature sensor circuit according to claim 4, wherein said current source comprises a current mirror circuit connected with said voltage source by a current path on an input side, and connected with said temperature sensor by a current path on an output side, and configured to supply same first currents to said voltage source and said temperature sensor, said voltage source comprises an operational amplifier type bandgap reference circuit having an output side connected with the current path on the input side of said current mirror circuit, supplied with the first current and configured to output the second voltage, said amplifier comprises a voltage-dividing resistance circuit connected with the output side of said operational amplifier type bandgap reference circuit and configured to amplify the second voltage with the first amplification factor to output the third voltage, said temperature sensor is supplied with the first current and comprises a diode or a transistor configured to generate the first voltage corresponding to the temperature, and said inversion amplifier comprises an inversion amplifying circuit configured to receiving the first voltage by an inversion input terminal and the third voltage by a non-inversion input terminal and configured to perform the inversion amplification with the second amplification factor to output the fourth voltage.

8. The temperature sensor circuit according to claim 4, wherein said voltage source comprises:

a first diode having an anode connected with a first node and a cathode connected with a ground voltage;

a first resistance connected with the first node at one end and a third node at the other end;

a plurality of second diodes connected in parallel and having cathodes connected with the ground voltage;

a third resistance connected with anodes of said plurality of second diodes at one end and a second node at the other end;

a second resistance connected with the second node at one end and the third node at the other end;

a first operational amplifier having a minus side input terminal connected with the first node and a plus side input terminal connected with the second node;

a first transistor having a source and a body connected with a power supply and a gate connected with an output terminal of said first operational amplifier; and a second transistor having a source and a body connected with a drain of said first transistor and a gate and a drain connected with the third node, said current source comprises:

said first and second transistors;

a third transistor having a source and a body connected with said power supply, and a gate connected with an output terminal of said first operational amplifier; and a fourth transistor having a source and a body connected with a drain of said third transistor, a gate connected with the third node, and a drain connected with a fifth node, said amplifier comprises:

a fourth resistance connected with the third node at one end and the fourth node at the other node; and a fifth resistance connected with the fourth node at one end and the ground voltage at the other end, said temperature sensor comprises:

a plurality of diodes connected in parallel and connected with the ground voltage at cathode sides and the fifth node at the anode sides, and said inversion amplifier comprises:

a sixth resistance connected with the fifth node at one end;

a seventh resistance connected with the other end of said sixth resistance at one end; and a second operational amplifier having an inversion input teriminal connected with the other end of said sixth resistance, a non-inversion input terminal connected with the fourth node, and an output terminal connected with the other end of said seventh resistance.

* * * * *